(12) United States Patent
Noll et al.

(10) Patent No.: US 6,187,753 B1
(45) Date of Patent: Feb. 13, 2001

(54) PSYLLIUM DRINK MIX COMPOSITIONS CONTAINING GRANULATED BASE

(75) Inventors: Joseph Clifford Noll; Hing Cheung Tse, both of Cincinnati, OH (US)

(73) Assignee: The Procter & Gamble Company, Cincinnati, OH (US)

(*) Notice: Under 35 U.S.C. 154(b), the term of this patent shall be extended for 0 days.

(21) Appl. No.: 09/570,869

(22) Filed: May 15, 2000

Related U.S. Application Data

(62) Division of application No. 08/507,739, filed on Jul. 26, 1995, now Pat. No. 6,133,233, which is a continuation of application No. 08/290,416, filed on Aug. 15, 1994, now abandoned, which is a continuation of application No. 08/090,981, filed on Jul. 12, 1993, now abandoned, which is a continuation of application No. 07/849,550, filed on Mar. 19, 1992, now abandoned.

(51) Int. Cl.$^7$ ................................................. A61K 31/70
(52) U.S. Cl. ........................... 514/23; 514/783; 536/1.11
(58) Field of Search ..................... 519/23, 783; 536/1.11

(56) References Cited

U.S. PATENT DOCUMENTS

| Re. 32,811 | 12/1988 | Rudin ................. 424/195.1 |
| 906,709 | 12/1908 | Heintz ................. 424/195.1 |
| 2,060,336 | 11/1936 | Near et al. ................. 99/131 |
| 3,148,114 | 9/1964 | Farhrenbach et al. ................. 167/55 |
| 3,455,714 | 7/1969 | Bishop et al. ................. 106/205 |
| 4,321,263 | 3/1982 | Powell et al. ................. 424/195 |
| 4,341,805 | 7/1982 | Chaudhary ................. 426/481 |
| 4,459,280 | 7/1984 | Colliopoulos et al. ................. 424/35 |
| 4,511,561 | 4/1985 | Madaus et al. ................. 424/195.1 |
| 4,548,806 | 10/1985 | Colliopoulos et al. ................. 424/35 |
| 4,551,331 | 11/1985 | Rudin ................. 424/105.1 |
| 4,557,938 | 12/1985 | Sander et al. ................. 426/453 |
| 4,565,702 | 1/1986 | Morley et al. ................. 426/93 |
| 4,619,831 | 10/1986 | Sharma ................. 426/93 |
| 4,639,367 | 1/1987 | Mackles ................. 424/45 |
| 4,731,246 | 3/1988 | Chavkin et al. ................. 424/195.1 |
| 4,737,364 | 4/1988 | Kalogris ................. 424/195.1 |
| 4,747,881 | 5/1988 | Shaw et al. ................. 106/209 |
| 4,784,861 | 11/1988 | Gori ................. 426/74 |
| 4,812,315 | 3/1989 | Tarabishi ................. 424/466 |
| 4,824,672 | 4/1989 | Day et al. ................. 424/195.1 |
| 4,828,842 | 5/1989 | Furst et al. ................. 424/480 |
| 4,883,788 | 11/1989 | Day et al. ................. 514/57 |
| 4,950,140 | 8/1990 | Pflaumer et al. ................. 424/439 |
| 4,978,529 | 12/1990 | Denick, Jr. ................. 424/195.1 |
| 4,996,051 | 2/1991 | Meer et al. ................. 424/195.1 |
| 4,999,200 | 3/1991 | Casillan ................. 424/480 |
| 5,009,916 | 4/1991 | Colliopoulos ................. 426/615 |
| 5,023,245 | 6/1991 | Kuhrts ................. 514/54 |
| 5,048,760 | 9/1991 | Barbera et al. ................. 241/9 |
| 5,149,541 | 9/1992 | Leis et al. ................. 424/489 |
| 5,219,570 | 6/1993 | Barbera ................. 424/195.1 |
| 5,234,687 | 8/1993 | Barbera et al. ................. 424/195.1 |

FOREIGN PATENT DOCUMENTS

| 2030448 | 5/1991 | (CA) | ................. 167/158 |
| 105195 | 4/1984 | (EP) | ................. A61L/2/06 |
| 144644 | 6/1985 | (EP) | ................. A23L/1/308 |
| 285201 | 10/1988 | (EP) | ................. A61K/35/78 |
| 323666 | 7/1989 | (EP) | ................. A61K/31/785 |
| 362926 | 4/1990 | (EP) | ................. A61K/35/78 |
| 412604 | 2/1991 | (EP) | ................. A23L/1/00 |
| 2616329 | 12/1988 | (FR) | ................. A61K/35/78 |
| WO 80/00658 | 4/1980 | (WO) | ................. A61K/9/00 |
| WO 85/01441 | 4/1985 | (WO) | ................. A61K/35/78 |
| WO 92/05707 | 4/1992 | (WO) | ................. A23L/1/0526 |

OTHER PUBLICATIONS

Physicians Desk Reference for Nonprescription Drugs, 10$^{th}$ Edition, pp. 641–642 (1989): "Orange Flavor Metamucil®"; Strawberry Flavor Metamucil®; .
Sugar Free Orange Flavor Metamucil®; "Sugar Free Lemon–Lime Flavor Effervescent Metamucil®"; Sugar Free Orange Flavor Effervescent Metamucil®; sold by the Procter & Gamble Company Fybogel®Orange, sold by Reckitt & Coleman.
Sunrise Smooth Metamucil®(Citrus and Orange Flavored; Regular and Sugar Free), sold by The Procter & Gamble Company.
Goodman and Gilman, The Pharmacologic Basis of Therapeutics, 6Edition, 1004 and 1007 (1980).
Garvin et al., Proc. Soc. Exp. Biol. Med., 120, 744–746 (1965).
Forman et al., Proc. Soc. Exp. Biol. Med., 127, 1060–1063 (1968).
Anderson et al., Fed. Proc., 46, 877 (1987).
Anderson et al., Am. J. Gastroenterology, 81, 907–919 (1986).
Fagerberg, Curr. Ther. Res., 31, 166 (1982).

*Primary Examiner*—Elli Peselev
(74) *Attorney, Agent, or Firm*—Loy M. White; Betty J. Zea; Karen F. Clark

(57) ABSTRACT

Psyllium-containing drink mix compositions comprising acid (e.g., citric acid) and granulated, less water soluble base (e.g., calcium carbonate agglomerated with maltodextrin).

6 Claims, No Drawings

PSYLLIUM DRINK MIX COMPOSITIONS CONTAINING GRANULATED BASE

CROSS REFERENCE TO RELATED APPLICATIONS

This is a division of application Ser. No. 08/507,739, filed Jul. 26, 1995, now U.S. Pat. No. 6,133,233, which is a continuation of application Ser. No. 08/290,416, filed Aug. 15, 1994, now abandoned, which is a continuation of application Ser. No. 08/090,981, filed Jul. 12, 1993, now abandoned, which is a continuation of application Ser. No. 07/849,550, filed Mar. 11, 1992, now abandoned.

BACKGROUND OF THE INVENTION

The present invention relates to psyllium-containing drink mix compositions comprising acid and granulated, less water soluble base. These compositions have improved aesthetics to encourage consumer compliance with a prescribed dosing regimen.

Products containing larger particle size psyllium seed husk with citric acid and carbonate salts (e.g., potassium bicarbonate; sodium bicarbonate; and/or calcium carbonate) are known, for example Effervescent Metamucil® sold by The Procter & Gamble Company (Physicians Desk Reference for Nonprescription Drugs, 10th Edition, page 642; copyright 1989). These Metamucil products generate carbon dioxide upon mixing with water, which assists in the mixing process. The resulting product has a distinct tart/sour taste which is compatible with the flavors used (lemon-lime; orange).

It has been discovered by the present invention that psyllium-containing drink mix compositions containing acid and certain less water soluble bases (e.g., calcium carbonate) have improved aesthetics when the base is in granulated form in the drink mix compositions. This is especially preferred when small particle size psyllium husk is utilized, when the pH of the drink mix in water is elevated and/or when the composition is prepared as an unflavored composition.

An object of the present invention is therefore to provide psyllium-containing drink mix compositions having acceptable aesthetics, including reduced psyllium gellation rate, good mixability, good suspendability, good taste, and acceptable texture. These and other objects of the present invention will become readily apparent from the detailed description which follows.

All percentages and ratios used herein are by weight, and all measurements made at 25° C., unless otherwise specified. Screen mesh sizes used herein are based on U.S. standards unless otherwise stated.

SUMMARY OF THE INVENTION

The present invention relates to psyllium-containing drink mix compositions comprising:

(a) from about 10% to about 99% psyllium husk;
(b) from about 0% to about 89% carrier materials;
(c) from about 0.5% to about 25% edible acid; and
(d) from about 0.5% to about 25% edible granulated, less water soluble base.

DETAILED DESCRIPTION OF THE INVENTION

The drink mix compositions of the present invention are psyllium-containing compositions in any form suitable for mixing with a liquid to form a psyllium husk suspension for oral consumption. Preferred form is a dry powder in bulk or unit dose form which readily mixes and disperses in the liquid. The components of the compositions according to the present invention, and representative amounts, are described in detail as follows.

Psyllium Husk

The psyllium husk used in the present invention is from psyllium seeds, from plants of the Plantago genus. Various species such as *Plantago lanceolate, P. rugelii,* and *P. major* are known. Commercial psyllium husk include the French (black; *Plantago indica*), Spanish (*P. psyllium*) and Indian (blonde; *P. ovata*). Indian (blonde) psyllium husk is preferred for use herein. Also preferred is psyllium husk which is at least about 85% pure, more preferably at least about 90% pure, and most preferably at least about 95% pure.

The psyllium husk is obtained from the seed coat of the psyllium seeds. It is typical to remove the seed coat from the rest of the seed by, for example, slight mechanical pressure, and then to use only the seed coat. The seed coat is preferably removed and sanitized by methods known in the art. Preferred is sanitized psyllium seed husk having substantially intact cell structure, the sanitization having been accomplished by methods such as ethylene oxide sanitization and superheated steam sanitization (as taught in U.S. Pat. No. 4,911,889, issued Mar. 27, 1990 to Leland et al., the disclosures of which are incorporated herein by reference in their entirety). It is also preferred that the psyllium husk used herein have reduced particle size.

Preferred psyllium husk utilized for compositions of the present invention have a substantial amount of small particle size psyllium husk. Such psyllium husk comprises psyllium husk particle sizes distributed such that more than about 90% is smaller than about 45 mesh, more preferably more than about 80% is smaller than about 60 mesh, and most preferably at least about 80% is smaller than about 80 mesh. Further preferred particle sizes are as follows: less than about 25% larger than about 60 mesh, and at least about 40% smaller than about 80 mesh. More preferred are particle size distribution of: less than about 10% larger than about 60 mesh, at least about 40% within the range of from about 80 mesh to about 200 mesh, and less than about 50% smaller than about 200 mesh. Particle sizes and particle size distributions may be readily determined by one of ordinary skill in the art, for example by sieving using an Alpine Laboratory Air Jet Sieve, Type 200 LS (sold by Alpine American Corp., Natick Mass.).

The drink mix compositions preferably contain from about 10% to about 99%, more preferably from about 20% to about 90%, most preferably from about 25% to about 75%, of psyllium husk.

Edible Acids

The term "edible acids", as used herein, means any water soluble acid material having a $pK_a$ of less than about 5, preferably within the range of from about 2 to about 5, and is safe for ingestion by humans. Examples of edible acids include, but are not limited to, citric acid, ascorbic acid, malic acid, succinic acid, tartaric acid, phosphoric acid, monopotassium phosphate, and mixtures thereof. Preferred are ascorbic acid, phosphoric acid, malic acid, and citric acid, with citric acid being most preferred.

The compositions of the present invention typically comprise from about 0.5% to about 25% edible acid, preferably from about 2% to about 10%, and more preferably from about 2% to about 5%. It is to be noted that for purposes of the present invention, it is preferred but not necessary that some or all of the edible acid be coated on the psyllium husk.

Edible Granulated, Less Water Soluble Base

The term "less water soluble base", as used herein, means any base material having a $pK_a$ of greater than about 7 which will react with the edible acid in water and is safe for ingestion by humans, and which further has a solubility in water of less than about 1 g/100 ml of water. Examples of edible, less water soluble bases include calcium carbonate, magnesium hydroxide, calcium hydroxide, aluminum hydroxide, magnesium oxide, magnesium carbonate, and mixtures thereof. Most preferred is calcium carbonate.

The term "granulated", as used herein relative to the less water soluble base materials, means the less water soluble bases which have been processed (e.g., by using typical granulation or agglomeration techniques) with a readily water soluble or dispersible binder material. Suitable binder materials for granulating the less water soluble bases are known, and include, for example, sugars (especially low molecular weight carbohydrates such as sucrose, glucose, fructose, dextrose), polyalcohols (e.g., mannitol, sorbitol), modified starches (e.g., maltodextrin, syrup solids), gums (e.g., pectin, guar gum, acacia gum), modified proteins (e.g., gelatin), agar-agar, and modified celluloses (e.g., carboxymethylcellulose, hydroxypropylmethylcellulose). Further, granulated, less water soluble base materials are known, being taught for example by U.S. Pat. No. 4,684,534, issued Aug. 4, 1987 to Valentine, and Canadian Patent No. 1,258,428, issued Aug. 15, 1989, both incorporated herein by reference in their entirety. In addition, certain granulated, less water soluble base materials are commercially available, such as calcium carbonate granulated with dextrose or maltodextrin sold by J.W.S. Delavau Company, Inc. (Philadelphia, Pa.).

The compositions of the present invention typically comprise from about 0.5% to about 25% edible granulated, less water soluble base, preferably from about 1% to about 15%, and more preferably from about 1% to about 10%. Preferably the granulated, less water soluble base is present in the compositions at a level sufficient to provide a drink mix, when combined with water, having a pH of greater than about 4.8, and more preferably greater than about 5 so as to provide drink mix compositions which consumers would recognize as being unflavored compositions. Also preferred is pH within the range of from about 5.0 to about 8.0, and most preferably within the range of from about 5.5 to about 7.0. Because the acid and base interact in the aqueous solution, this pH measurement is the pH of the aqueous drink mix suspension at a time after combining the composition with water when the pH remains constant.

For example, when compositions according to the present invention comprising granulated calcium carbonate (granulated with maltodextrin) and citric acid (in ratio of about 2 equivalents base to 1 equivalent acid) is mixed with water, the pH profile is such that the composition starts out at a pH of about 3.5, increases to pH greater than about 5.0 within a few minutes, and levels off at about 5.5 at about 7 minutes. The gellation rate of such composition is essentially the same as the rate for compositions of substantially lower pH containing citric acid without the base. The acid flavor impact is greatly reduced.

It is preferred that the compositions of the present invention comprise acid and base in ratios (based on acid/base equivalents) of less than about 2:1 (acid equivalents:base equivalents), more preferably less than about 1:1. Ratios of acid:base in the range of about 1:1 to about 1:3 are preferred, with about 1:2 being most preferred.

Optional Carrier Materials

Optional carrier materials useful for the compositions of the present invention must be safe for oral administration to humans, and may be chosen by one of ordinary skill in the art as appropriate for the drink mix form and use intended for the product. Psyllium-containing drink mix products, methods for making, and carrier materials useful for these products, are described more fully, for example, in U.S. Pat. No. 4,459,280, to Colliopoulos et al., issued Jul. 10, 1984; U.S. Pat. No. 4,548,806, to Colliopoulos et al., issued Oct. 22, 1985; and U.S. Pat. No. 4,321,263, to Powell et al., issued Mar. 23, 1982; all of which are incorporated by reference herein in their entirety. The drink mix compositions of the present invention comprise from about 0% to about 89%, preferably from about 10% to about 80%, and more preferably from about 25% to about 75%, of carrier materials.

Most preferred are products of the present invention in dry powder form suitable for mixing in a liquid to form a psyllium-containing drink. Preferred carrier materials for such powder forms are known and are also described in detail, for example, in U.S. Pat. Nos. 4,459,280 and 4,548,860, incorporated hereinbefore by reference. Preferred are such powders (preferably sugar free) comprising maltodextrin. Also especially preferred are powders comprising agglomerates of psyllium and/or coated psyllium, especially agglomerated with maltodextrin and/or sucrose.

Agglomerating materials preferred for use herein are therefore known. These agglomerating materials include those selected from the group consisting of water dispersible hydrolyzed starch oligosaccharide, mono-saccharide, di-saccharide, polyglucose, polymaltose, and mixtures thereof. Compositions of the present invention preferably comprise from about 0.5% to about 20% of agglomerating material coating on said psyllium husk, preferably from about 1% to about 10%, and more preferably from about 1% to about 5%.

Hydrolysis of starch may be accomplished by a reaction of either acid, enzymes (e.g., alpha-amylase, beta-amylase or amyloglucosidase), or a combination of the two either together or reacted in series. The hydrolysis will follow different pathway depending on whether acids or enzymes are used. The result is a mixture of oligosaccharides which may be separated for their different properties. The resulting separated water dispersible (preferably soluble) hydrolyzed starch oligosaccharides are classified by their reducing sugar content, i.e., the mono- or di-saccharides such as glucose or fructose. The percent reducing sugar content in the particular hydrolyzed starch oligosaccharide is measured on a weight/weight basis as the Dextrose Equivalent (or "D.E."). Hydrolyzed starch oligosaccharides with a D.E. of from 0 to 20 are called maltodextrins. The solid maltodextrins have low to moderate sweetness, low to moderate hygroscopicity, solubility in water and alcohol, and have reduced browning. Above a D.E. of about 20 the hydrolyzed starch oligosaccharides are called syrup solids. The syrup solids are soluble but have a more noticeable sweetness and are more hydroscopic. Above a D.E. of about 30, the syrup solids become less desirable for use herein. A preferred water dispersible hydrolyzed starch oligosaccharide therefore has a D.E. of from about 0 to about 30. A preferred maltodextrin has a D.E. of from about 5 to about 20, more preferably about 10

(i.e., a reducing sugar content ratio of 10% w/w of the oligosaccharide).

The mono-saccharides are those carbohydrates that in general are aldehyde-alcohols or ketone alcohols that are a hexose or pentose and have a sweet taste. They are readily soluble in water and form crystal-line solids. Examples of the di-saccharides are those carbohydrates which yield two mono-saccharides on hydrolysis. Examples of di-saccharides are lactose, sucrose and maltose.

As noted hereinbefore, preferred compositions of the present invention are those which have some or all of the edible acid coated on the psyllium husk, and further preferably such that the psyllium husk is agglomerated. Preferred single layer coating of the psyllium husk is achieved by utilizing equipment (referred to herein as single pass fluidizing powder wetting apparatus) which operates preferably by dropping a dry blend psyllium-containing material through a highly turbulent annular zone formed by a cylindrical wall and a rotating shaft with variously pitched attached blades. An edible acid-containing solution is preferably sprayed into this zone to contact a dry psyllium-containing blend. The resulting coated, preferably agglomerated, psyllium husk is dropped to a fluid bed dryer where the added solvent is removed. An example of this equipment is the Bepex Turboflex Model No. TFX-4 (sold by Bepex Corporation; Minneapolis, Minn.) with a six square foot bed vibrating fluid bed dryer (sold by Witte Corporation, Inc.; Washington, N.J.).

The psyllium-containing blend preferably comprises from about 25% to about 100% of psyllium. Optional components for the psyllium-containing blend include, but are not limited to, edible acid, edible base, sweetening agents (preferably low calorie sweetening agents), coloring agents, agglomerating materials (especially maltodextrin), dietary fibers such as brans (e.g., wheat bran; oat bran; rice bran) and/or pharmaceutical agents (e.g., aspirin; non-steroidal antiinflammatories; sennosides). As noted hereinbefore, it is preferred that the psyllium-containing blend be dry, but it is possible to utilize suitable solvents (e.g., alcohols and/or water) if one is careful, especially if water is utilized, not to cause substantial hydration and swelling of the psyllium, since this is expected to adversely affect the rate at which psyllium husk can interact with water or other fluids.

The solution mixture preferably comprises one or more edible acids to be sprayed onto the psyllium-containing blend. This may be prepared by selecting a liquid (e.g., alcohol and/or water) as appropriate for the edible acid(s) being coated onto the psyllium husk. However, it is preferred that water be utilized. Preferred is also spraying the solution mixture onto a dry psyllium-containing blend. Preferably, when a spraying technique is used, the solution mixture is an aqueous solution comprising from about 0.5% to about 80% (preferably from about 5% to about 50%) of edible acid. It is also optionally possible to repeat the coating and drying steps, thereby building up a coating on the psyllium husk which comprises several thin layers of the edible acid. In addition, other optional materials may be present in the solution mixture, such as coloring agents, pharmaceutical agents, and mixtures thereof.

Other methods for preparing compositions according to the present invention include dry blending the ingredients and other means of multiple layer coating of the psyllium husk. The latter may be accomplished by using, for example, fluid bed agglomerating equipment such as the Fluid Air, Inc. Model 0300 Granulator-Dryer.

Further, it is to be recognized that while the preferred drink mix compositions of the present invention are unflavored, it is possible to include with such preferred compositions sweetening agents, preferred being low calorie sweetening agents including, but not limited to, aspartame, saccharin, cyclamate, acesulfame, and mixtures thereof. Further, it is possible to use the present compositions as unflavored base formulations to make flavored compositions by adding flavoring agents, especially when the flavoring system is such that it is not compatible (chemically or aesthetically) with an acidic composition.

Method of Treatment

The present invention also relates to a method for providing laxation and regulating bowel function for a human in need of such treatment. This method comprises administering to a human in need of such treatment a safe and effective amount of a psyllium-containing composition of the present invention. Ingestion of from about 2.5 grams to about 30 grams per day of the psyllium fiber in a composition according to the present invention is appropriate in most circumstances to produce laxation. However, this can vary with the size and condition of the patient, and such matters will, of course, be apparent to the attending physician. However, since the psyllium material is nontoxic, even higher ingestion levels can be used without undue side effects. A typical dose for laxation purposes involves administering from about 3 to about 15 grams of psyllium fiber in one dose.

The present invention further relates to methods for reducing serum cholesterol levels in humans. These methods comprise orally administering to a human in need of having a lowered blood cholesterol level a safe and effective amount of a psyllium-containing composition of the present invention. Ingestion of compositions of the present invention comprising amounts sufficient to administer from about 2.5 grams to about 30 grams per day of psyllium fiber, preferably from about 5 grams to about 15 grams, is appropriate in most circumstances. However, this can vary with the size and condition of the patient, and the patient's blood cholesterol level. Such matters will, of course, be apparent to the attending physician. However, since the psyllium material is nontoxic, even higher ingestion levels can be used without undue side effects, keeping in mind the materials herein have the hereinbefore noted laxative effect.

Treatment of the patient to reduce serum cholesterol levels comprises chronic ingestion in order to lower and maintain the lowered cholesterol levels. Daily ingestion is preferred, and a daily ingestion of from about 5 grams to about 15 grams of the psyllium fiber is most commonly used, with said ingestion preferably being at 2 or 3 regularly spaced intervals throughout the day. Again, depending on the patient's size and cholesterol level in the patient's blood, this can be varied.

The following examples further describe and demonstrate embodiments within the scope of the present invention. These examples are given solely for the purpose of illustration and are not to be construed as limitations of the present inventions as many variations thereof are possible without departing from the spirit and scope.

EXAMPLE

A drink mix composition according to the present invention is prepared having the following components:

| Components | Weight % |
|---|---|
| Psyllium([1]) | 57.5 |
| Maltodextrin | 32.8 |
| Citric Acid | 3.7 |
| $CaCO_3$([2]) | 5.9 |
| Aspartame | 0.1 |

([1])Psyllium husk, steam sanitized (95%+ purity); particle size of 100% smaller than 80 mesh U.S. Standard screen.
([2])90% calcium carbonate agglomerated with 10% maltodextrin, supplied by J.W.S. Delavau Company, Inc., Philadelphia, PA.

This composition is prepared by first agglomerating the psyllium husk with the maltodextrin and citric acid by spraying a dry blend of the psyllium husk/maltodextrin with an aqueous solution of citric acid in a single pass fluidizing powder wetting apparatus followed by drying. This agglomerate is then dry blended with the remaining components, which includes the agglomerated calcium carbonate. Compositions may also be prepared by substituting an equivalent amount of granulated calcium hydroxide, magnesium hydroxide, aluminum hydroxide or magnesium oxide for the agglomerated calcium carbonate and/or substituting an equivalent amount of phosphoric acid for the citric acid and/or using larger particle size psyllium in this example.

These compositions are readily mixable in water to provide a psyllium suspension having reduced gellation rate and are mixable in a variety of liquids for human consumption without unacceptably noticeable acid flavor impact. Consumption of a drink prepared by mixing 1 teaspoon of these compositions (about 5.5–6 grams) according to the present invention in 8 ounces of water provides effective laxation benefit to a patient in need of such benefit.

What is claimed is:

1. A method for providing laxation for humans, said method comprising orally administering to a human in need of laxation a safe and effective amount of a liquid suspension of a psyllium-containing drink mix composition comprising:
   (a) from about 10% to about 99% of psyllium husk having a particle size distribution such that at least about 90% of said husk is smaller than about 45 mesh;
   (b) from about 0% to about 89% of carrier materials selected from the group consisting of maltodextrin, citric acid, sweetening agents, flavoring agents, coloring agents, and combinations thereof;
   (c) from about 0.5% to about 25% of edible acid having a $pK_a$, of less than about 5 selected from the group consisting of citric acid, ascorbic acids malic acid, succinic acid, tartaric acid, phosphoric acid, monopotassium phosphate, and mixtures thereof; and
   (d) from about 0.5% to about 25% of edible granulated, base having a solubility in water of less than about 1 g/100 ml of water and a $pK_a$ of greater than about 7 selected from the group consisting of calcium carbonate, magnesium hydroxide, calcium hydroxide, aluminum hydroxide, magnesium oxide, and mixtures thereof;
   wherein said psyllium husk is coated with said edible acid and wherein further, the ratio of acid equivalents to base equivalents is less than about 2:1.

2. A method for providing laxation for humans, said method comprising orally administering to a human in need of laxation a safe and effective amount of a liquid suspension of a psyllium-containing drink mix composition comprising:
   (a) from about 20% to about 90% of psyllium husk having a particle size distribution such that at least about 90% of said husk is smaller than about 45 mesh;
   (b) from about 10% to about 80% of carrier materials selected from the group consisting of maltodextrin, citric acid, sweetening agents, flavoring agents, coloring agents, and combinations thereof;
   (c) from about 2% to about 10% of edible acid having a $pK_a$ of less than about 5 selected from the group consisting of citric acid, ascorbic acid, malic acid, phosphoric acid, and mixtures thereof; and
   (d) from about 1% to about 15% of edible granulated base having a solubility in water of less than about 1 g/100 ml of water and a pKa of greater than about 7 selected from the group consisting of calcium carbonate, magnesium hydroxide, calcium hydroxide, aluminum hydroxide, magnesium oxide, and mixtures thereof;
   wherein said psyllium husk is coated with said edible acid and wherein further, the ratio of acid equivalents to base equivalents is less than about 2:1.

3. A method for providing laxation for humans, said method comprising orally administering to a human in need of laxation a safe and effective amount of a liquid suspension of a psyllium containing drink mix composition comprising:
   (a) from about 25% to about 75% of psyllium husk having a particle size distribution such that at least about 90% of said husk is smaller than about 45 mesh;
   (b) from about 25% to about 75% of carrier materials selected from the group consisting of maltodextrin, citric acid, sweetening agents, flavoring agents, coloring agents and combinations thereof;
   (c) from about 2% to about 5% of edible acid having a $pK_a$ of less than about 5 selected from the group consisting of citric acid, phosphoric acid, and mixtures thereof; and
   (d) from about 1% to about 10% of calcium carbonate;
   wherein said psyllium husk is coated with said edible acid and wherein further, the ratio of acid equivalents to base equivalents is less than about 2:1.

4. A method for providing laxation for humans, said method comprising orally administering to a human in need of laxation a safe and effective amount of a liquid suspension of the psyllium-containing composition according to claim 3, wherein said psyllium containing drink mix composition, when combined with water, has a pH within the range of from about 5.0 to about 8.0 and, wherein further said psyllium containing drink mix composition does not comprise any flavoring agent.

5. A method for reducing serum cholesterol levels in humans, said method comprising orally administering to a human in need of such treatment a safe and effective amount of a liquid suspension of a psyllium-containing drink mix composition comprising:
   (a) from about 10% to about 99% of psyllium husk having a particle size distribution such that at least about 90% of said husk is smaller than about 45 mesh;
   (b) from about 0% to about 89% of carrier materials selected from the group consisting of maltodextrin, citric acid, sweetening agents, flavoring agents, coloring agents, and combinations thereof;
   (c) from about 0.5% to about 25% of edible acid having a $pK_a$ of less than about 5 selected from the group consisting of citric acid, ascorbic acid, malic acid, succinic acid, tartaric acid, phosphoric acid, monopotassium phosphate, and mixtures thereof; and (d) from about 0.5% to about 25% of edible granulated, base having a solubility in water of less than about 1 g/100 ml of water and a $pK_a$ of greater than about 7 selected from the group consisting of calcium carbonate, magnesium hydroxide, calcium hydroxide, aluminum hydroxide, magnesium oxide, and mixtures thereof;

wherein said psyllium husk is coated with said edible acid and wherein further, the ratio of acid equivalents to base equivalents is less than about 2:1.

6. A method for reducing serum cholesterol levels in humans, said method comprising orally administering to a human in need of such treatment a safe and effective amount of a liquid suspension of a psyllium containing drink mix composition comprising:

(a) from about 25% to about 75% of psyllium husk having a particle size distribution such that at least about 90% of said husk is smaller than about 45 mesh;

(b) from about 25% to about 75% of carrier materials selected from the group consisting of maltodextrin, citric acid, sweetening agents, flavoring agents, coloring agents and combinations thereof;

(c) from about 2% to about 5% of edible acid having a $pK_a$ of less than about 5 selected from the group of citric acid, phosphoric acid, and mixtures thereof; and (d) from about 1% to about 10% of calcium carbonate;

wherein said psyllium husk is coated with said edible acid and wherein further, the ratio of acid equivalents is less than about 2:1.

* * * * *